United States Patent [19]
Frank

[11] 3,769,497
[45] Oct. 30, 1973

[54] URINE LIQUID DISCHARGE MONITOR
[75] Inventor: Ulrich Anton Frank, Yardley, Pa.
[73] Assignee: Hoffman-La Roche Inc., Nutley, N.J.
[22] Filed: Sept. 10, 1971
[21] Appl. No.: 179,395

[52] U.S. Cl............... 235/92 FL, 73/217, 73/426, 128/295, 235/92 R, 235/92 T, 235/94
[51] Int. Cl............................................ H03k 21/34
[58] Field of Search......................... 235/92 FL, 94; 128/295; 73/217, 426

[56] References Cited
UNITED STATES PATENTS
1,092,082  3/1914  Staaf.................................... 73/217
2,626,385  1/1953  Schumann........................... 128/295
753,001    2/1904  Piper..................................... 73/217

Primary Examiner—Maynard R. Wilbur
Assistant Examiner—Robert F. Gnuse
Attorney—Samuel L. Welt et al.

[57] ABSTRACT

A bio-medical device for monitoring liquid output, comprising a receptacle adapted to be dumped each time it is filled with a critical volume, a sensor for generating an output signal with each dumping operation, and a counter responsive to the output signal to provide a total volume count.

5 Claims, 4 Drawing Figures

PATENTED OCT 30 1973 3,769,497
SHEET 1 OF 2
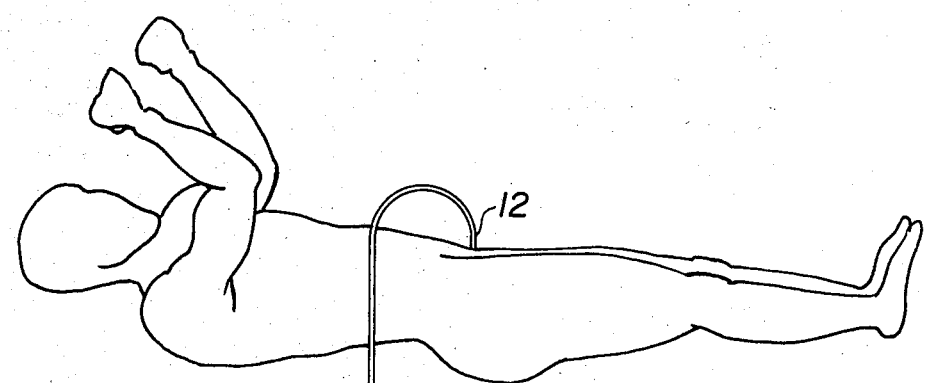
FIG. 1
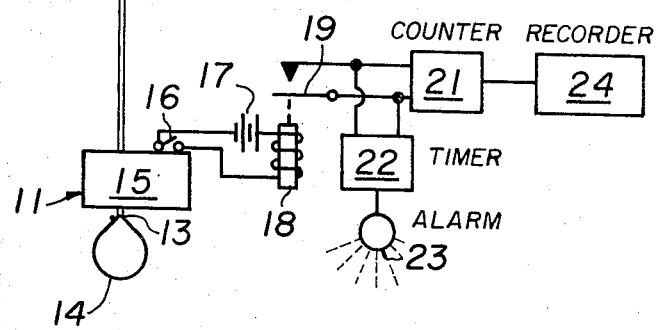
FIG. 2
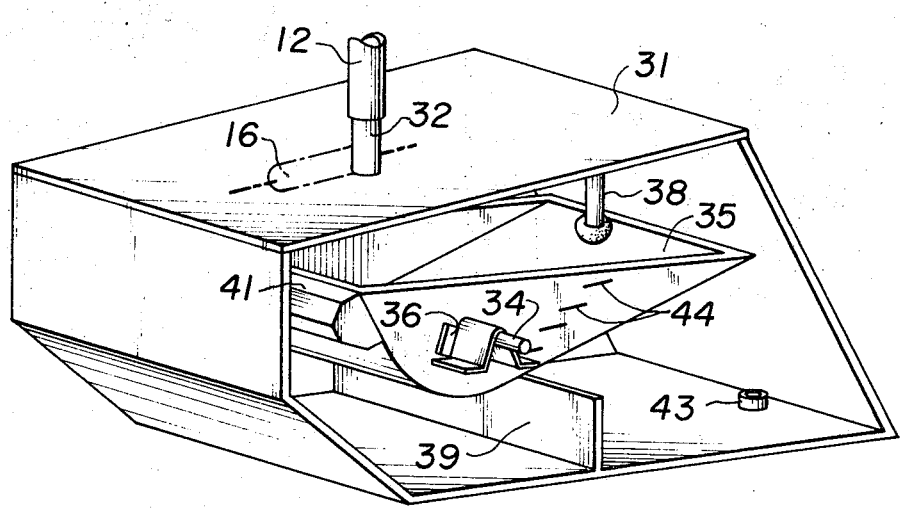

PATENTED OCT 30 1973 3,769,497

URINE LIQUID DISCHARGE MONITOR

BACKGROUND OF THE INVENTION

The present invention relates to devices for measuring liquid output especially for bio-medical purposes and more particularly for measuring the rate and/or totalized volume of the discharge or drainage of body liquids, such as chest drainage, urine output, etc.

As is well known, urine output, which is one of the liquids commonly drained from critically ill patients, is an important medical parameter for diagnostic purposes. Accordingly, it has been found desirable to measure urine output for hospitalized cases. For example, it has been found necessary to measure urine output in the treatment of a significant number of surgical patients as this measurement not only permits physicians to evaluate renal function, but also provides a means of monitoring cardiac output, tissue perfusion, the general state of hydration, and the effects of drugs and infused parenteral fluids. For these reasons urine output is measured in most acutely ill patients.

The present method of both collecting and monitoring urine, is to permit it to flow from a catherized patient to a disposable graduated plastic bag or other container hung beneath the bed. The contents and total urine output is measured intermittently by nursing personnel. In many cases, the amount of nursing time involved in reading, recording and emptying the devices is quite significant. The latter occurs from the fact that the most generally accepted frequency for urine output measurement is hourly and many physicians in the surgeon class desire continuous monitoring. As may be evident from the above, such devices have not been altogether satisfactory for the simple reason that they require constant visual observation and record keeping to provide a continuous monitoring capability. In addition, an electrical on-line output is not available for supplying such valuable data to a computer of the type now being employed for diagnostic monitoring or simply for data recording purposes. Further, it is rather difficult to ascertain the addition of a small amount of urine in a partially filled bag. The use of urine monitors based on drop counting, suffers from the variation in drop size, i.e., surface tension and great cost.

SUMMARY OF THE INVENTION

The purpose of the present invention is to provide a reliable, simple and safe digitizing liquid monitor which will obviate the problems encountered with prior art devices of the type mentioned above. The latter is accomplished by utilization of a critical liquid volume dumping technique whereupon with each dumping operation of a receptacle upon being filled with the critical volume, a counting unit is energized and, in an additional aspect of the invention, an automatic alarm operation is reset.

In a further object of the invention the dumping mechanism, which is employed as the vehicle for liquid measurement, may be readily removed from the monitor for disposal to obviate the need of cleaning the liquid collecting components.

BRIEF DESCRIPTION OF THE DRAWINGS

FIG. 1 is a block diagram showing an embodiment of a digitizing urine output.

FIG. 2 is a more detailed view of the particular liquid volume indicating unit illustrated in FIG. 1.

DESCRIPTION OF A PREFERRED EMBODIMENT

Figure 3:
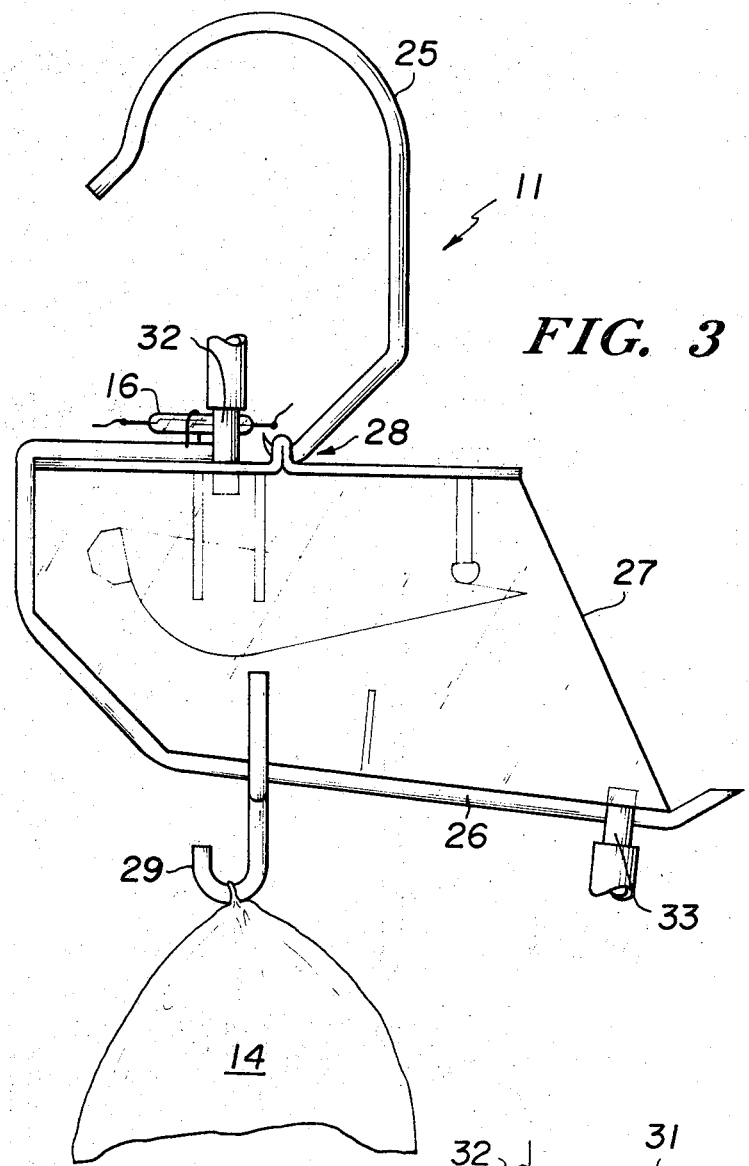
FIG. 3 is a detailed view of the particular liquid dumping container illustrated in FIG. 2.

With reference to the drawings there is shown in FIG. 1 a digitizing urine monitoring system comprising a urine flow volume indicating unit, generally designated as 11, which is coupled via a suitable conduit 12 to a catheterized patient. Another suitable tubing 13 couples an outlet at the bottom of the urine volume indicating unit to a collection bag 14. The indicating unit is provided with a pivoted receptacle bucket 15 of critical or specific volume which is dumped once the volume has been filled. Adjacent the urine unit volume indicating unit is a sensing device 16 which is electrically connected to a battery 17 and thence connected in series with the coil 18 of a relay.

The switch 19 of the relay is electrically connected in series with two units including a counter 21 such as, for example, the Kessler-Ellis Number E-14-11 capable of providing outputs in terms of cc of urine volume if the pivoted bucket is of 1 cubic cm. critical volume. If the bucket is of larger, say 10 cubic cm., volume a fixed 0 may be added as the last digit of the counter. The second unit to which switch 19 is connected is a timing unit 22 such as Industrial Timer Corps. GTD, the latter being connected to an alarm 23. The timer 22, is of the adjustable type whereby if not reset within a preset period of time would be activated to energize alarm 23 of the visual and/or audio type. If desired, counter 21 could be coupled to a recorder 24, or to a rate meter to give outputs in terms of cc./hr.

Each time the bucket 15 is dumped, sensor 16 is activated to complete an electrical circuit including battery 17 and the coil 18, which in turn closes switch 19 to generate a pulse. Upon the presence of a pulse, counter 21 is stepped and at the same time the timer 22 is reset to prevent alarm 23 from being energized. In essence, by counting the number of times of dumping or the number of times in which a small container of fixed volume is filled, one may, in effect by way of counter 21, provide an accurate digitzed count of total urine production, if the container volume is established to be equal to the smallest increment of accuracy required. At the same time, alarm 23, via the use of an interval timer 22, will be energized based on the absence of a minimal volume of urine detected within a specific period of time, e.g., 5, 15, or 30 minutes, which time is predetermined by simple pre-adjustment of the interval timer.

With reference to FIG. 2, there is shown a preferred embodiment of the urine volume indicating unit 11 comprising a main body or framework including a hook 25 for hanging the unit to a patient's bedrail. Framework portion 26 is designed for removably receiving a container assembly 27, and for being pivotally supported by hook 25 at the pivotal connection 28. At the bottom of framework portion 26 and in line with the center of gravity of the unit, is a projection 29 for holding the collection bag 14. Adjacent the pivotal connection 28 is a magnetic reed switch sensor 16 mounted on framework 26. The reed switch is shown rotated 90° for better viewing.

Figure 4:
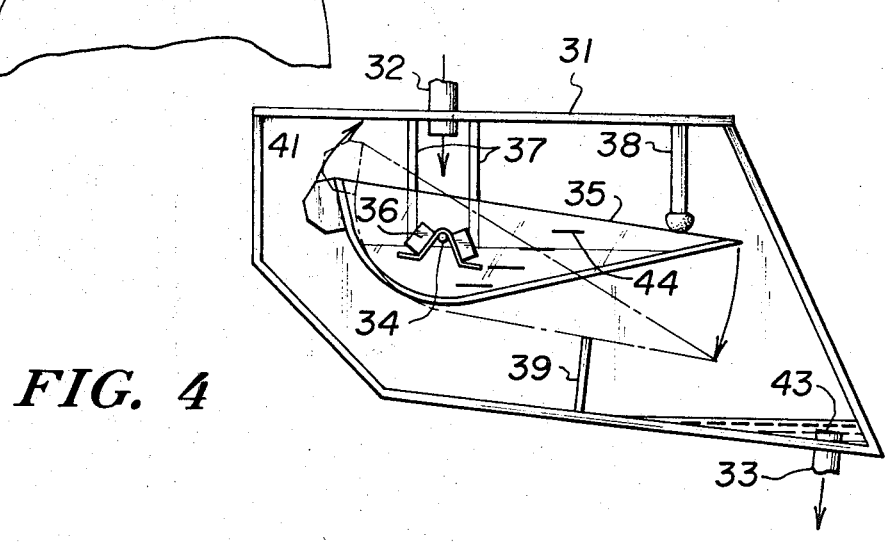
FIG. 4 is a perspective view of the specific liquid dumping container illustrated in FIG. 2.

A preferred embodiment of container 27 is illustrated in FIGS. 3 and 4, wherein there is shown a twopiece plastic body 31 compatible for being removably seated within framework 26 and having extension units 32,33 to provide inlet and outlet passages respectively for urine flow, and adapted for respective connections via suitable tubing conduits 12 and 13, to the catheterized patient and collection bag. The inlet 32 is projected below the ceiling of the container, effectively preventing drops from following along the ceiling and failing to end up in pivoted bucket 15.

Within container 27 are a pair of pivot support knife edges 34 slightly projecting inwardly from each side of body 31 and positioned to form a pivot axis about a line perpendicular with and intersecting a line defining points through the center of gravity of the entire monitoring unit. The dumping bucket or receptacle 15 is provided, beneath inlet 32, with a pair of angle brackets 36 at each of its sides for pivotal mounting about knife edges 34. The bucket is designed to hold a critical or specific volume when filled and immediately prior to freely pivoting about knife edges 34 for a dumping or liquid discharge operation. This is achieved by proper configuration of bucket 15 vis-a-vis the pivotal axis traversing the center of gravity of the free hanging portion of the monitoring unit. In the embodiment disclosed the bucket is designed to accommodate 10 cc of urine prior to being dumped. The shape of the bucket is so designed that the last few drops before dumping have a much greater influence on the equilibrium of the bucket than most of the other liquid flowing into the bucket. This is achieved by the increasingly shallow angle given to the bucket lip.

To capture or limit the rotational movement bucket within the container are bucket restraining members 37 comprising of vertical rods integral with the plastic body and located at each side of the bucket, which extend downwardly to about the upper side of the angle brackets 36. A return stop 38, also integral with the plastic body, restricts upward movement of the bucket, while a dump stop 39 restricts downward movement except for that necessary to completely dump the urine in the bucket. To otherwise normally maintain the bucket in an upward receiving position is a magnet weight 41 which is also employed, when the bucket is in a dump position, as illustrated by the phantom lines 42, to cause the magnetic reed switch to be in a closed condition. At the bottom of the container the outlet extension 33 is projected upwardly slightly at 43 above the bottom of the container to act as a standpipe thereby enabling heavier non-urine components such as stones, blood, etc. to accumulate there to be observed by the nurse or physician. This obviates the need of looking for hard to find pathological components such as stones in the collection bag. Graduations 44 are provided on the bucket for measuring the actual volume in the bucket between dumps, if desired.

Although the mechanism for sensing the dumping of the bucket is shown to be a magnetic arrangement, most any suitable arrangement might be used. For example, a photodiode could be adapted with a maximum or minimum reflected area to detect bucket rotation. Also a reed switch might be toggled by the bucket movement, etc.

In operation, urine from the catheterized patient flows through the connection tubing 12 to the hanging portion of the urine monitoring unit and, in particular, via extension conduit 32 is directed into dumping bucket 15 which is normally maintained in its upward position by virtue of weight 41 acting about the pivot line or axis defined by extension/knife edges 34. As the urine fills up in the bucket and approaches the critical capacity of the bucket, which in its specific embodiment is 10 cc of urine, the bucket becomes unbalanced and rotates, as viewed from FIG. 3, in a clockwise position to dump or discharge the urine volume contained within the bucket. Rotation of the magnet 41 causes the magnetic reed switch 16 to be closed thereby completing an electrical circuit via battery 17 and coil 18 causing the switch 19 to close and, in turn, stepping counter 21 to count a volume of 10 cc. An interval timer 22 which is set for a specific period of time (for example, 20 minutes) will be reset to prevent alarm 23 from being energized, unless, of course, a 20 minute period runs out during which time 10 cc have not been collected to cause the bucket to dump. Depending on the particular type of counter employed, the urine volume output can be counted for any period of time or a recorder might be utilized to convey such information.

As noted, the used container assembly 27, which has direct contact with the body fluids, is disposable. However, the remainder of the urine volume indicating unit 11, including the framework and switch, is thought of as reusable since the body fluids are not in touch with it.

It should be understood, of course, that although the specific embodiment disclosed has been with reference to urine monitoring, other liquids, such as those resulting from chest drainage, could be similarly monitored and totalized as to volume output.

I claim:

1. A bio-medical device for monitoring body liquid output comprising:
   container means having a single receptacle for receiving a critical volume of body liquid and for discharging the liquid upon being filled with the critical volume;
   means pivotally supporting said receptacle within said container for an oscillatory motion between a liquid filling normal position and a liquid discharge position;
   counting means responsive to each discharge, for monitoring the total volume of liquid flow via said container means;
   a liquid collection bag connected with said container means; and,
   separation means in said container for accumulating the sediment in the liquid passing to the liquid collection bag.

2. A bio-medical device according to claim 1 wherein said separation means includes a standpipe.

3. A bio-medical device for monitoring body liquid output comprising:
   container means having a single receptacle for receiving a critical volume of body liquid and for discharging the liquid upon being filled with the critical volume;
   means pivotally supporting said receptacle within said container for an oscillatory motion between a liquid filling normal position and a liquid discharge position;
   counting means responsive to each discharge, for monitoring the total volume of liquid flow via said container means;

frame support means for removable receiving said container adapting the container for disposable purposes;

said counting means including sensor means mounted on said frame support means for generating an electrical output signal with each receptacle discharge; and means for pivotally suspending said support means about a pivotal connection.

4. A bio-medical device for monitoring body liquid output comprising:

disposable container means including a pivotal receptacle means for receiving a specific volume of body liquid and for dumping the liquid upon being filled with the specific volume;

assembly means adapted for pivotal suspension and for removably receiving said disposable container means; and counting means including sensor means mounted on said assembly means and responsive to each receptacle means dump, for monitoring the total volume of liquid flow via said receptacle means.

5. A bio-medical device according to claim 4 whereby said receptacle is provided with a configuration to cause a shift in the receptacle center of gravity when filled, to be impelled from the normal position to the discharge position.

* * * * *